(12) United States Patent
Nuss et al.

(10) Patent No.: US 12,667,195 B2
(45) Date of Patent: Jun. 30, 2026

(54) HEADREST

(71) Applicant: GRAMMER AG, Ursensollen (DE)

(72) Inventors: Ralph Nuss, Poppenricht (DE); Manuel Bösl, Freudenberg (DE)

(73) Assignee: GRAMMER AG, Ursensollen (DE)

( * ) Notice: Subject to any disclaimer, the term of this patent is extended or adjusted under 35 U.S.C. 154(b) by 64 days.

(21) Appl. No.: 18/104,929

(22) Filed: Feb. 2, 2023

(65) Prior Publication Data

US 2023/0301436 A1 Sep. 28, 2023

(30) Foreign Application Priority Data

Feb. 14, 2022 (DE) ..................... 10 2022 103 413.5
Feb. 1, 2023 (DE) ..................... 10 2023 102 433.7

(51) Int. Cl.
| | |
|---|---|
| *A47C 7/38* | (2006.01) |
| *B60N 2/862* | (2018.01) |
| *B60N 2/865* | (2018.01) |
| *B60N 2/868* | (2018.01) |

(52) U.S. Cl.
CPC ................ *A47C 7/38* (2013.01); *B60N 2/862* (2018.02); *B60N 2/865* (2018.02); *B60N 2/868* (2018.02)

(58) Field of Classification Search
CPC ........ B60N 2/865; B60N 2/868; B60N 2/862; A47C 7/38
See application file for complete search history.

(56) References Cited

U.S. PATENT DOCUMENTS

| | | |
|---|---|---|
| 7,871,130 B2 | 1/2011 | Da Silva Netto |
| 9,061,616 B2 * | 6/2015 | Kondrad ................ B60N 2/853 |
| 9,333,887 B2 * | 5/2016 | Talamonti .............. B60N 2/874 |
| 9,566,884 B2 * | 2/2017 | Line ....................... B60N 2/821 |
| 10,562,425 B2 | 2/2020 | Jarrin |
| 2010/0201176 A1 | 8/2010 | Da Silva |
| 2015/0130247 A1 | 5/2015 | Kondrad |
| 2015/0375650 A1 | 12/2015 | Talamonti |
| 2017/0313219 A1 | 11/2017 | Line |
| 2020/0039406 A1 | 2/2020 | Nuss |
| 2021/0031661 A1 | 2/2021 | Bulle |

FOREIGN PATENT DOCUMENTS

| | | |
|---|---|---|
| AU | 2009340037 A1 | 9/2011 |
| DE | 102015206956 A1 | 10/2015 |
| DE | 102017104761 A1 | 9/2018 |
| DE | 102018005316 A1 | 1/2020 |

OTHER PUBLICATIONS

Excerpt of German examination report of Aug. 11, 2022 in Application DE 10 2022 103 413.5, 1 page.
Chinese Search Report Dated Jun. 16, 2025, 1 Page.
Chinese Search Report Dated Feb. 6, 2026, 1 Page.

* cited by examiner

*Primary Examiner* — Syed A Islam

(74) *Attorney, Agent, or Firm* — LUCAS & MERCANTI, LLP; Klaus P. Stoffel

(57) ABSTRACT

A headrest with a head contact part, which can be moved between a front and a rear position by an adjustment device, wherein the adjustment device includes at least one link. The link forms at least one joint with the retaining device and at least one joint with the head contact part. The adjustment device includes an adjustment housing that at least partially covers the at least one link. The adjustment housing is motion-connected to the retaining device in such a way that it can follow a movement of the links.

12 Claims, 10 Drawing Sheets z x

HEADREST

The invention relates to a headrest, in particular for a motor vehicle seat.

CROSS-REFERENCE TO RELATED APPLICATIONS

The present application claims priority of DE 10 2022 103 413.5, filed Feb. 14, 2022, and DE 10 2023 102 433.7, filed Feb. 1, 2023, the priority of these applications is hereby claimed and these applications are incorporated herein by reference.

BACKGROUND OF THE INVENTION

Such a headrest is known from obvious prior use. The headrest comprises a head contact part that is mounted by means of a four-link joint on a retaining device mounted on the backrest. Two links are arranged one behind the other and each form a joint with the retaining device and a joint with the head contact part. The head contact part can thus be adjusted between a rear position and a front position.

In order to avoid injury to the vehicle occupant and for reasons of higher quality appearance, the headrest has an adjustment housing that is firmly connected to the structure of the backrest and in which the four-link joint can assume all positions. The adjustment range of the backrest of the vehicle seat also had to be taken into account, which increased the adjustment range of the headrest.

A disadvantage of this prior art is that the adjustment housing leaves a voluminous visual impression, which can be undesirable.

SUMMARY OF THE INVENTION

It was the object of the invention to create a headrest of the type described above, wherein the link arrangement takes up less space.

The headrest comprises a head contact part that is mounted on a retaining device fixed to the seat so as to be movable between a front and a rear position by means of an adjustment device. In the front position, the head contact part is moved closer to the seat occupant's head than in the rear position. The adjustment device comprises at least one link. The link is designed as a rod, for example, which has a large longitudinal extension in relation to its width and height. The adjustment device comprises two, three, four or more than four links, for example. The at least one link forms a joint with the retaining device and a joint with an attachment of the head contact part. Two links, for example, form a four-link joint in this way with the attachment and the retaining device.

The adjustment device comprises an adjustment housing that at least partially covers the at least one link. The adjustment housing is designed separately from the adjustment device, for example. I.e. the adjustment housing is separate from the at least one link and any connections between two links. However, the adjustment housing can be attached to the adjustment device, to a link or a pair of links, for example. For example, the adjustment housing can be moved relative to at least one link.

For example, the adjustment housing covers the at least one link substantially completely. The entire housing or at least one housing component is, for example, essentially rigid, i.e. immovable in itself. The entire housing or at least one housing part is made of a plastic, for example. The aforementioned features are intended to prevent injury to seat occupants and improve the appearance of the headrest. The adjustment housing comprises at least one housing part.

The adjustment housing is motion-connected to the adjustment device in such a way that it can follow a movement of the links.

An advantage of the invention is in that the adjustment housing follows the movement of the links and therefore the adjustment housing can be less voluminous. This gives the headrest a favorable appearance, in particular a slimmer side view.

The adjustment housing is connected to a link, e.g. fixed to the link. In this case, the adjustment housing is formed in one piece, for example, i.e. formed by one part or by housing parts that are firmly connected to one another. In this embodiment, the adjustment housing is swiveled together with the link. If there is a first link and a second link or two pairs of links, each with two laterally offset links, the adjustment housing can be fixed to the first link or to the second link or to one of the pairs of links.

According to an alternative embodiment, at least two housing parts are designed to be movable relative to one another, wherein one housing part is attached to a first link and another housing part is attached to a second link. This embodiment offers the possibility of a very narrow extension of the adjustment housing in the adjustment direction. During the relative movement of the links to one another and to the retaining device or to the attachment, the housing parts also move relative to one another. For example, the housing parts each have guide means with which the housing parts are guided together. Alternatively or additionally, in this embodiment, for example, the two housing parts overlap in at least one area.

In another embodiment, at least one housing part forms a joint with the retaining device. In this case, the adjustment housing is formed in one piece, for example, so that the entire adjustment housing can be swiveled around the joint with the retaining device.

At least two housing parts are designed to be movable towards one another, for example. For example, each housing part forms a joint with the retaining device.

At least one housing part of the adjustment housing forms a joint with the head contact part. The housing part forms a joint with the attachment of the head contact part, for example. For example, the adjustment housing is formed in one piece; then the one-piece adjustment housing forms a joint with the holding device and a joint with the head contact part. According to an alternative, the adjustment housing has at least two housing parts, e.g. at least a first housing part forms a joint with the head contact part. Another housing part forms a joint with the head contact part or is connected to the first housing part, e.g. hinged.

One embodiment is formed by a mixed form, wherein a first housing part of the adjustment housing is fixedly connected to one of the links and a further housing part, which is movable relative to the first housing part, forms a joint with the retaining device and is connected, e.g. hinged, to the first housing part.

By means of the joint, the housing part for example, e.g. a one-piece adjustment housing, is carried along by the head contact part or the attachment and thereby swiveled around the joint with the holding device. For example, a carrier element on one of the parts of the head contact part and housing part forms a joint with a counter element of the other part of the housing part and head contact part.

The carrier element is formed by a pin, for example, which engages in a recess of the counter element. For example, the head contact part has a pin that engages in a recess of the adjustment housing. Alternatively, the carrier element is, for example, a recess in the head contact part in which a pin of the adjustment housing engages. According to an alternative embodiment, at least a first housing part of the adjustment housing comprises a driver element that forms a joint with a second housing part that is movable relative to the first housing part.

In order to enable the joint between the adjustment housing and the head contact part in the event of different movements of the head contact part and the housing, at least one joint is formed with an elongated hole in which a pin engages in a translationally movable and rotationally movable manner.

The adjustment housing has, for example, at least two housing parts, wherein a first housing part is movable relative to a second housing part. For example, the housing is divided parallel to a longitudinal axis of the housing. In this way, for example, different movements of several links can be compensated for when the housing parts are attached to different links. The housing parts are guided together, for example. Alternatively, the housing parts overlap, e.g. to compensate for different movements of the housing parts and to avoid gaps that allow access to and a view of the adjustment device. At least two housing parts overlap, e.g. in all positions of the adjustment device.

Alternatively, the adjustment housing is made in one piece. Two or more housing parts are e.g. securely connected to one another so that no relative movement can take place. Alternatively, the adjustment housing, for example, is formed in one piece. The adjustment housing is tubular in shape, for example.

At least one housing part is designed to be cup-like, for example. The links of the adjustment device can be at least partially enclosed in this way.

The adjustment device comprises, for example, at least two links that form a four-link joint with the retaining device and the head contact part. For example, two links or two pairs of links are provided, each of which forms a four-link joint with the retaining device and the head contact part. A pair of links comprises two links arranged offset to one another transversely to the adjustment direction. The two links form a four-link joint with the retaining device and the head contact part. The two links or the two pairs of links are arranged, for example, offset one behind the other in the adjustment direction on the retaining device and the head contact part. For example, the links move within an angle range of +/−30° from the vertical.

For example, a head contact housing of the head contact part overlaps the at least one housing part of the adjustment housing and is movable relative to the housing part. For example, the head contact housing forms an interior space in which the adjustment housing of the adjustment device engages. Alternatively, the adjustment housing engages over the head contact housing, for example. In this case too, gaps between the head contact housing and the adjustment housing of the adjustment device can be avoided, in which parts of a user's body can become trapped, and visually the view of the adjustment mechanism of the adjustment device is prevented.

Exemplary embodiments of the invention are described in the following figure description, additionally with reference to the drawings. For the sake of clarity—also insofar as different embodiments are concerned—identical or comparable parts or elements or regions are designated with the same reference numerals, sometimes with the addition of lowercase letters.

Features described only in relation to one embodiment may also be provided in any other embodiment of the invention within the scope of the invention. Such modified embodiments—even if not shown in the drawings—are covered by the invention.

All disclosed features are essential to the invention in themselves. The disclosure of the application hereby also includes in full the disclosure content of associated priority documents (copy of the prior application) as well as cited publications and the described prior art devices, also for the purpose of including individual or several features of these documents in one or several claims of the present application.

DETAILED DESCRIPTION OF THE INVENTION

Figure 1:
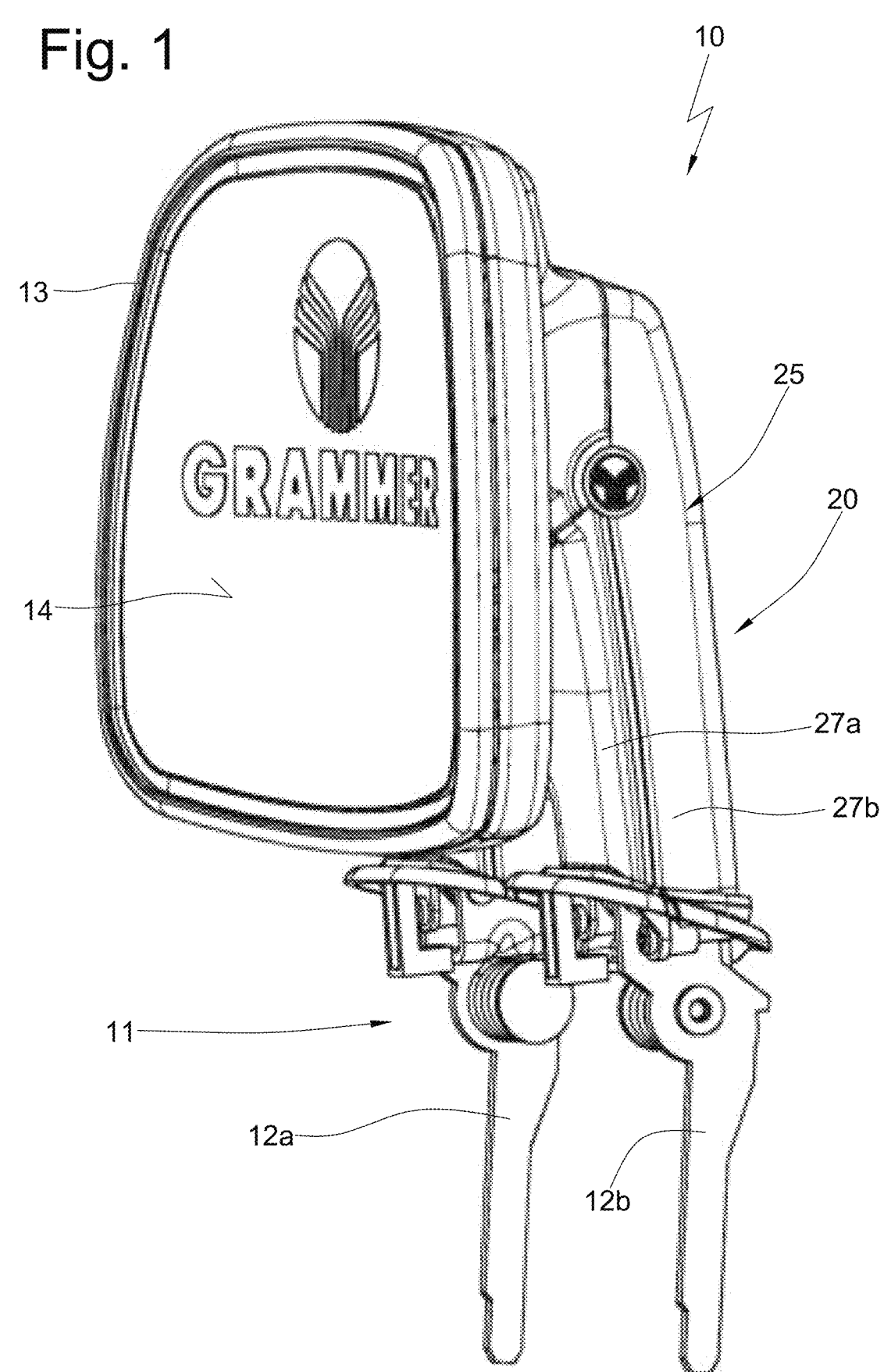
FIG. 1 shows a perspective view of a first exemplary embodiment of a headrest from diagonally in front, wherein a head contact part is moved into a front position and is arranged in a lower end position relative to an adjustment device.
Figure 2:
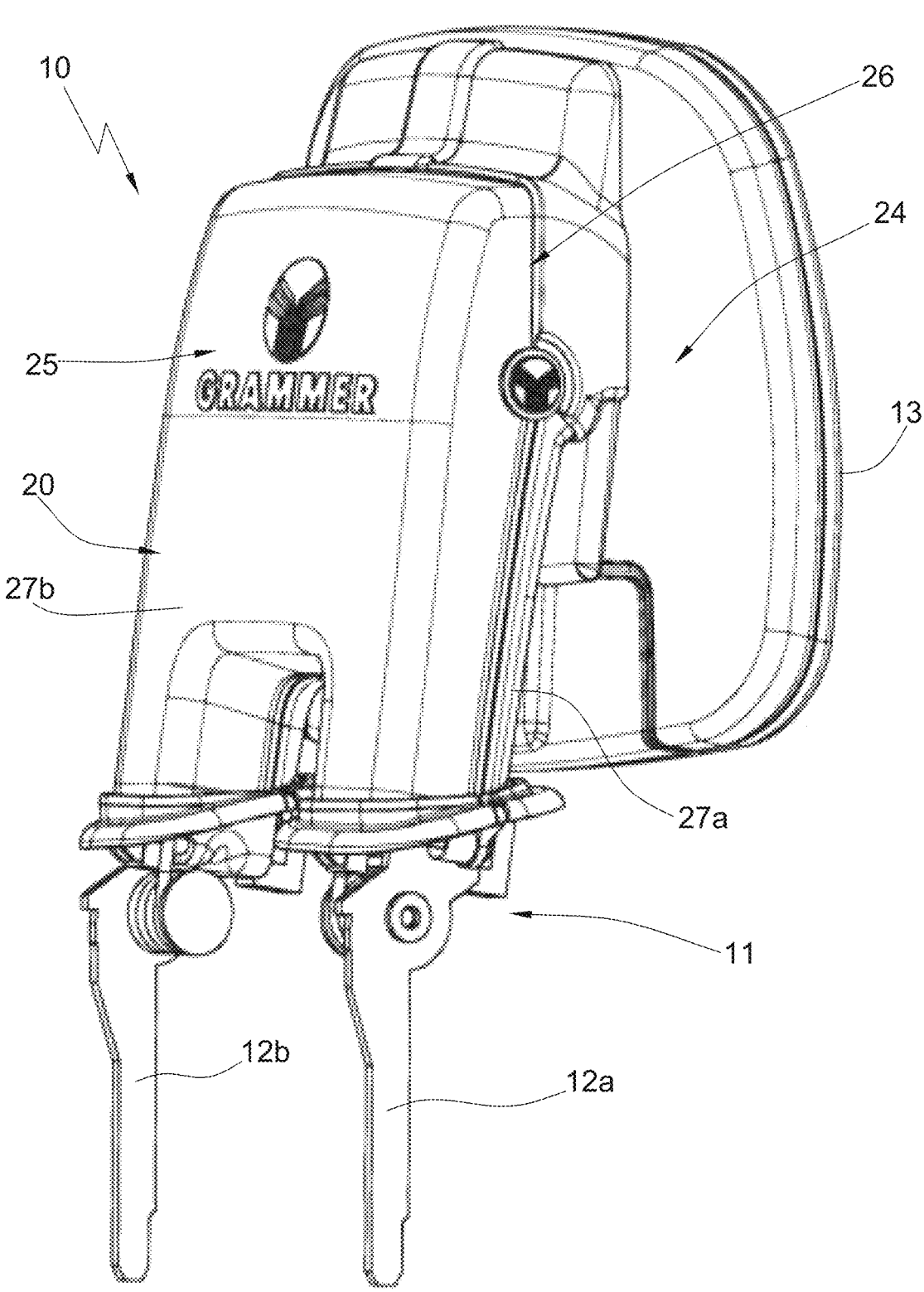
FIG. 2 shows a perspective view of the headrest according to claim 1 from diagonally behind.
Figure 3:
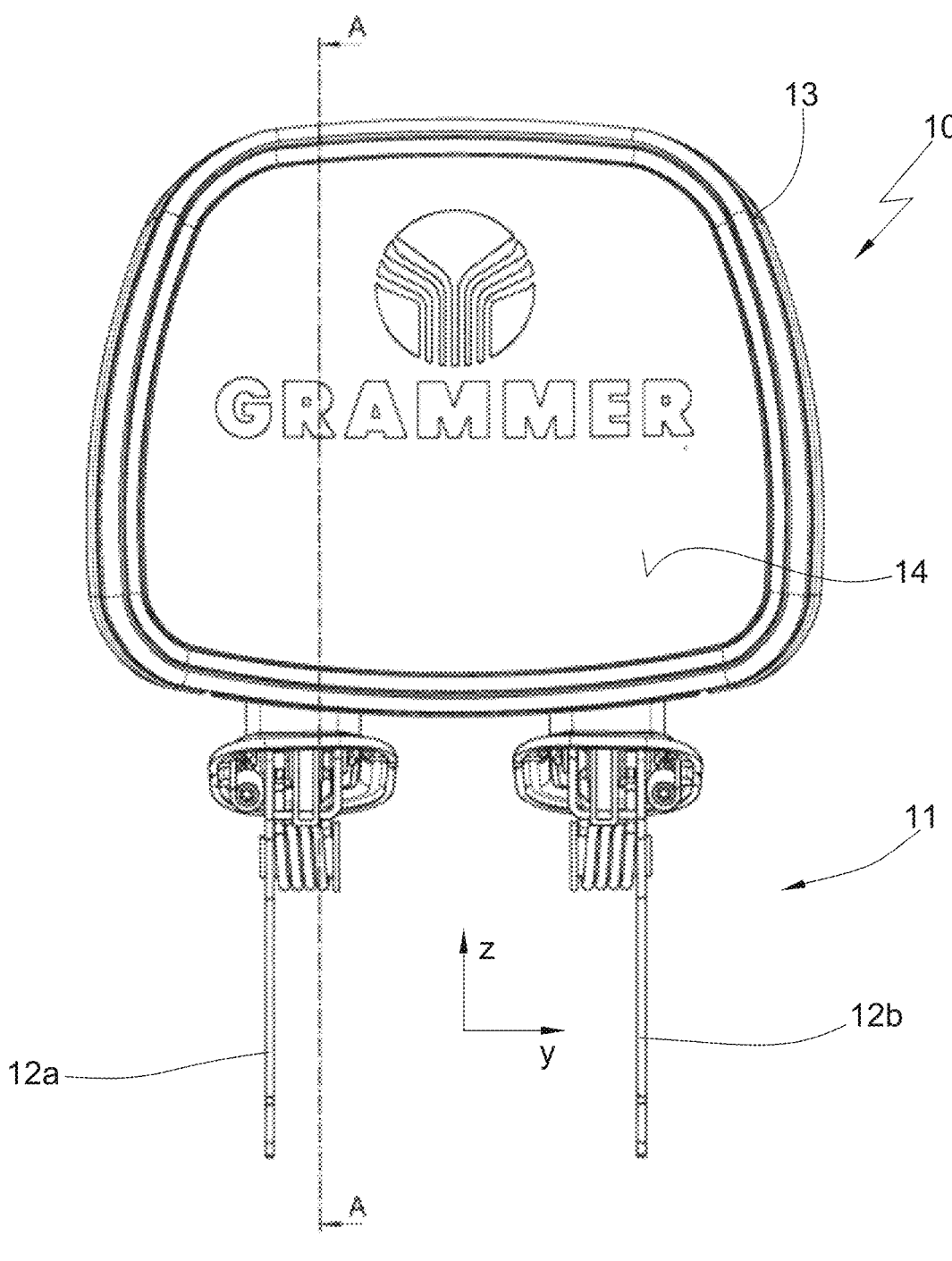
FIG. 3 shows a front view of the headrest according to FIG. 1.

The headrest according to a first exemplary embodiment of the invention is indicated with the reference numeral 10 in the figures.

The headrest 10 comprises a retaining device 11 with which the headrest 10 can be fixed to a vehicle seat. In the present exemplary embodiment, the retaining device 11 comprises retaining elements 12a and 12b, which can be fixed to the seat structure. In addition, the headrest 10 comprises a head contact part 13 with a head contact surface 14, which forms a support for the head of the seat occupant. The head contact part 13 is adjustable between a front and a rear position with respect to an X-direction by means of an adjustment device 20. In addition, the head contact part 13 can be adjusted in the Z-direction between an upper and a lower position.

Figure 4:
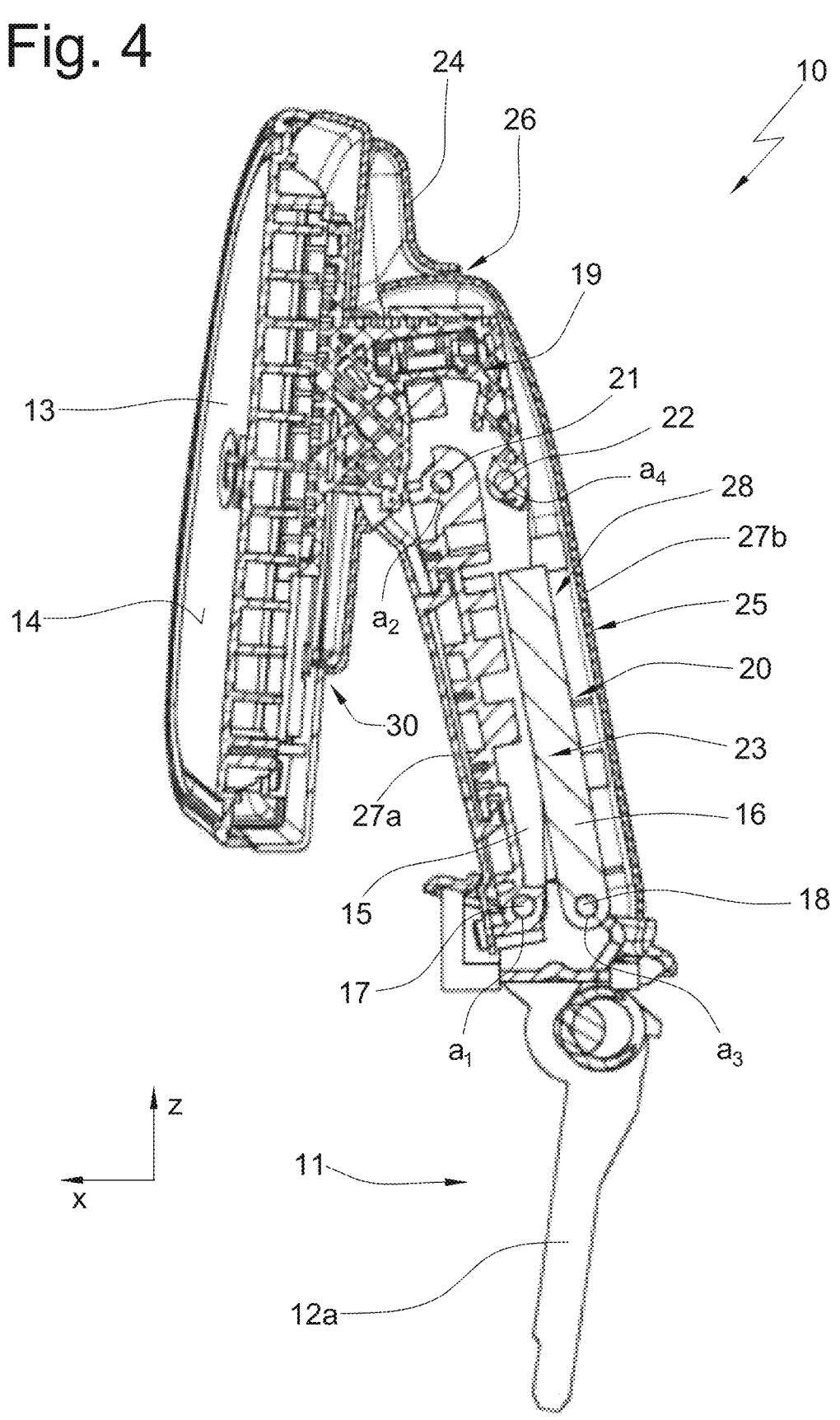
FIG. 4 shows a sectional view according to the sectional line A-A in FIG. 3, wherein the head contact part is arranged in a lower end position.
Figure 5:
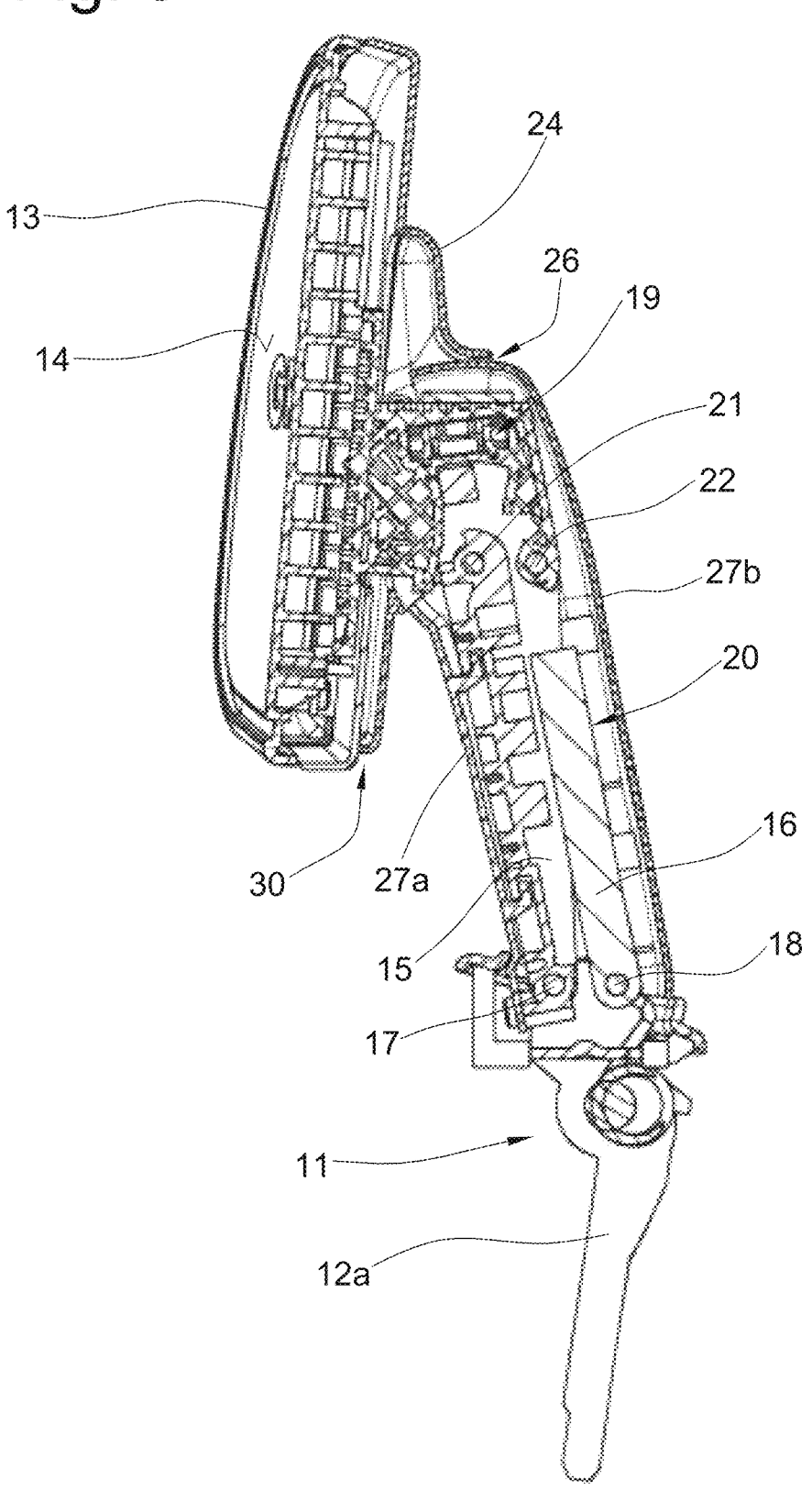
FIG. 5 shows a sectional view according to FIG. 4, wherein the head contact part is arranged in an upper end position.
Figure 6:
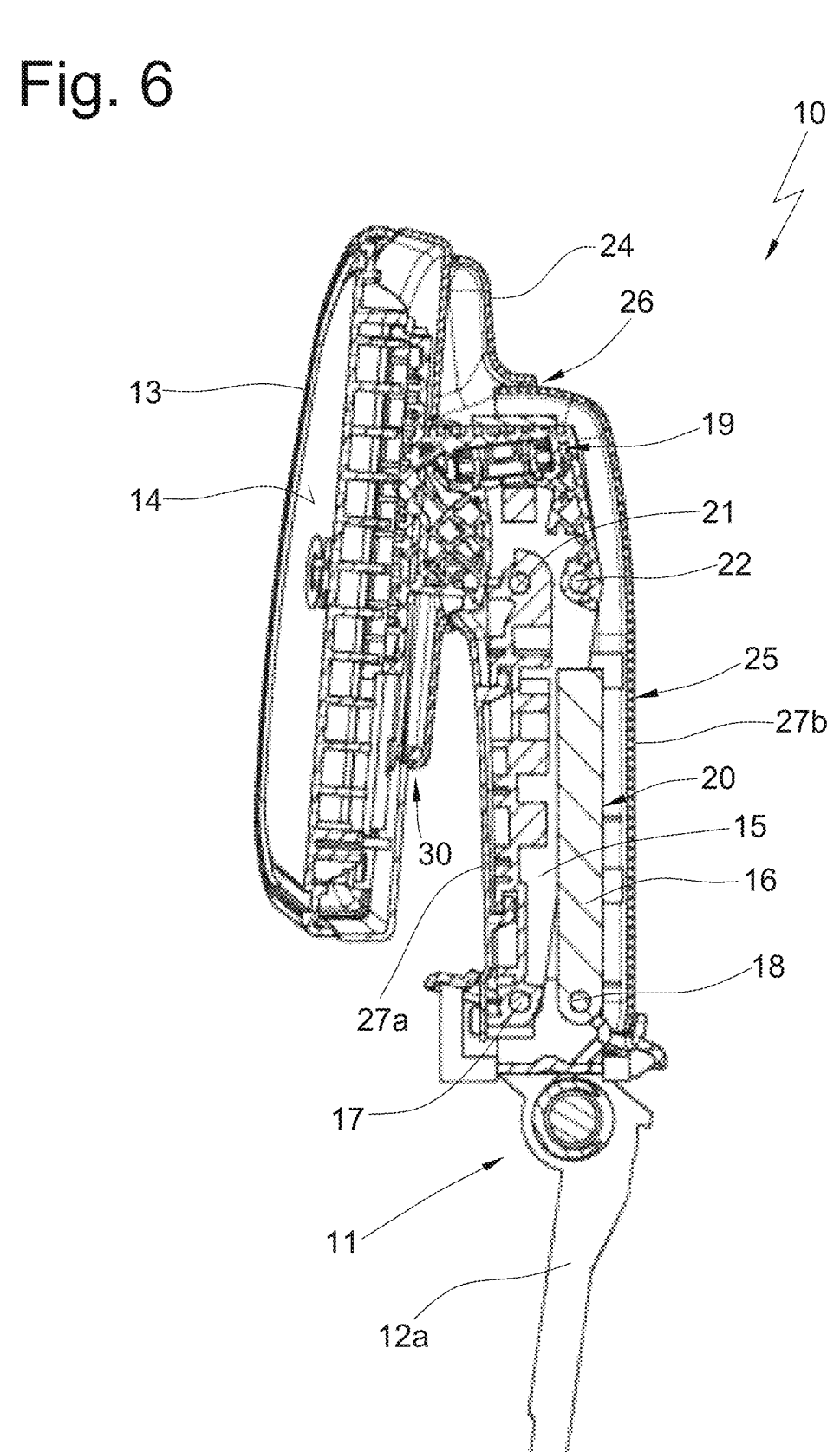
FIG. 6 shows a sectional view according to FIG. 4, wherein the head contact part is in a position between the front and rear end positions.
Figure 7:
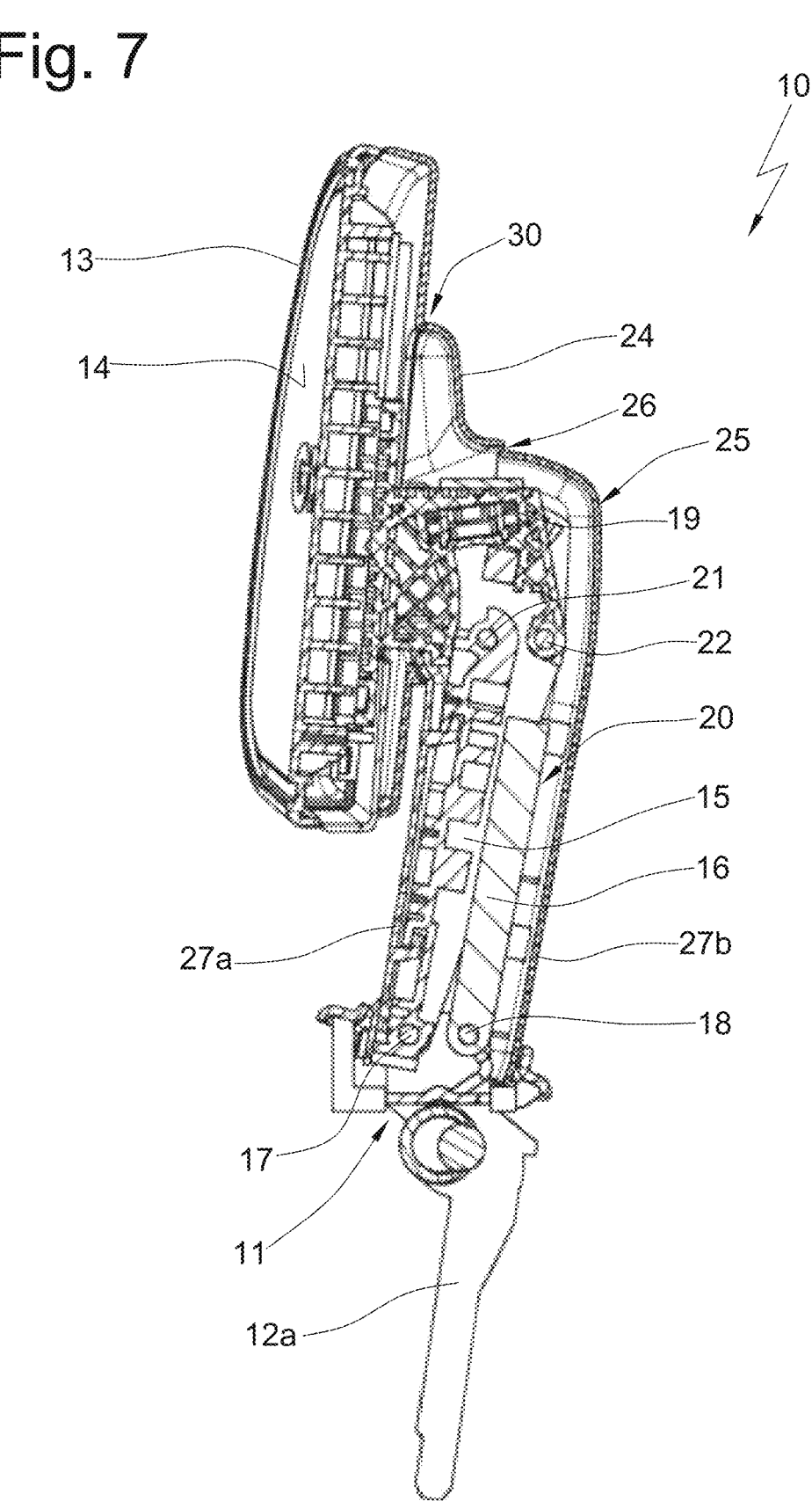
FIG. 7 shows a sectional view according to FIG. 5, wherein the head contact part is in a rear position.

The front position is shown in FIGS. 1 to 5 and the rear position is shown in FIG. 7. FIG. 6 shows an intermediate position between the rear position and the front position.

According to FIG. 4, the adjustment device 20 comprises links 15 and 16. The link 15 forms a joint 17 with the retaining device 11 with the pivot axis a1 as well as a joint 21 with an attachment 19 of the head contact part 13 with the pivot axis a2. The link 16 also forms a joint 18 with the retaining device 11 with the pivot axis a3, as well as a joint 22 with an attachment 19 of the head contact part 13 with the pivot axis a4. The links 15 and 16 form a four-link joint 23 with which the attachment 19 is moved on a coupling curve between the rear position and the front position.

The head contact part 13 comprises a head contact housing 24 and the adjustment device 20 comprises an adjustment housing 25. The head contact housing 24 is provided with an opening 26 such that the adjustment housing 25 can engage in the opening 26 and thus there is no gap between the head contact housing 24 and the adjustment housing 25 in any position of the head contact part 13.

The adjustment housing 25 is formed by two housing shells 27a and 27b that are securely connected to one another so that they form one unit. In this embodiment, the housing shells 27a and 27b are immovable relative to one another. The adjustment housing 25 is securely connected to the link 15. Therefore, when the head contact part 13 moves between the rear position and the front position, it swivels with the link 15 (see FIGS. 4, 6 and 8). An interior space 28 of the adjustment housing 25 is formed such that the links 15 and 16 and, in this exemplary embodiment, also at least a part of the attachment 19 are accommodated in the adjustment housing 25.

As an aside, the attachment 19 comprises first guide means that cooperate with second guide means of the head contact part 13 to adjust the head contact part 13 in the z-direction and form a height adjustment device 30. FIG. 4 shows the lower end position and FIG. 5 shows the upper end position of the head contact part 13. The head contact housing 24 does not move in the z-direction, for example, when the head contact part 13 is adjusted in height relative to the attachment 19.

According to an alternative embodiment, the adjustment housing 25 forming a unit is securely connected to the link 16, while it is not connected to the link 15. The adjustment device 20 is designed as in the first exemplary embodiment. This embodiment is not shown.

In an alternative further embodiment, the adjustment housing 25 is formed from two parts 27a and 27b that are movable relative to one another, wherein a front housing part 27a is attached to the front link 15 and a rear housing part 27b is attached to the rear link 16. The adjustment device 20 is designed as in the first exemplary embodiment. This embodiment is also not shown.

Figure 9:
FIG. 9 shows the headrest according to FIG. 8 in the front position.
Figure 10:
FIG. 10 shows a headrest according to a further embodiment of the invention in a rear position.

A further exemplary embodiment is shown in FIGS. 9 and 10. The adjustment device 20 is designed as in the first exemplary embodiments. A link 15 forms a joint 17 and a link 16 forms a joint 18 with a retaining device 11, which is securely connected to a structure of the backrest 34. The link 15 further forms a joint 21 and the link 16 forms a joint 22 with an attachment 19 of the head contact part 13.

Figure 8:
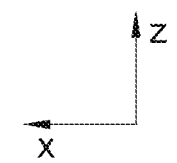
FIG. 8 shows a headrest according to a second exemplary embodiment of the invention in a rear position.

In this case, the adjustment housing 25 is formed by two housing shells 27a and 27b, which are securely connected to one another such that they cannot be moved. The links 15 and 16 and the attachment 19 are covered by the adjustment housing 25 and are therefore shown with dashed lines. A rear end position of the adjustment device 20 is shown in FIG. 8 and a front end position is shown in FIG. 9.

The adjustment housing 25 forming a movement unit forms a joint 29 with the retaining device 11. The joint 29 has the swivel axis a5. In addition, the attachment 19 forms a carrier 31 that engages with a counter carrier 32 of the adjustment housing, wherein the carrier and counter carrier

32 form a joint 33. In this case, the carrier is formed by a pin and the counter carrier is formed by an elongated hole in which the pin engages.

Due to the joint 33 in the upper area of the adjustment housing 25, the adjustment housing 25 is carried along the swivel axis a5 of the joint 29. The elongated hole provides the pin with sufficient degrees of freedom, which are necessary for the movement due to the different movements of the pin and the adjustment housing 25. The adjustment housing 25 is designed in such a way that the links 15 and 16 and the attachment 19 have space therein in all positions.

Swiveling the adjustment housing 25 means that the interior space 28 must have less volume than with a fixed adjustment housing 25.

In this second embodiment, only a z-position of the head contact part 13 is shown, but this embodiment may be formed with a head contact part 13 fixed relative to the attachment 19 or alternatively with a height adjustment device 30 with a head contact part 13 adjustable in the z-direction relative to the attachment 19.

The invention claimed is:

1. A headrest, comprising: an adjustment device; a retaining device; and a head contact part movable between a front and a rear position by the adjustment device, wherein the adjustment device comprises at least one link that forms at least one joint with the retaining device and at least one joint with the head contact part, wherein the adjustment device further comprises an adjustment housing that at least partially covers the at least one link, wherein the adjustment housing is motion-connected to the retaining device so that the adjustment device follows a movement of the at least one link, wherein the adjustment housing is configured as a unit made up of a single part or multiple parts fixed to each other, wherein the unit forms a joint with the retaining device, and wherein the unit forms a joint with the head contact part so that the adjustment housing is carried along by the head contact part.

2. The headrest according to claim 1, wherein the adjustment housing has at least two housing parts including a first housing part that is movable relative to a second housing part.

3. The headrest according to claim 2, wherein at least one of the housing parts is connected to the at least one link.

4. The headrest according to claim 2, wherein the first housing part forms a first joint and the second housing part forms a second joint with the retaining device.

5. The headrest according to claim 2, wherein at least one of the housing parts is connected to another of the housing parts.

6. The headrest according to claim 1, wherein the joint is a translational guide and rotary guide.

7. The headrest according to claim 2, wherein at least one of the housing parts is configured to be cup-like.

8. The headrest according to claim 1, wherein the adjustment device comprises at least two links that each form a four-link joint with the retaining device and the head contact.

9. A headrest, comprising: an adjustment device; a retaining device; and a head contact part movable between a front and a rear position by the adjustment device, wherein the adjustment device comprises at least one link that forms at least one joint with the retaining device and at least one joint with the head contact part, wherein the adjustment device further comprises an adjustment housing that at least partially covers the at least one link, wherein the adjustment housing is motion-connected to the retaining device so that the adjustment device follows a movement of the at least one link, wherein the adjustment housing is configured as a unit, wherein the unit forms a joint with the retaining device, and wherein the unit forms a joint with the head contact part, wherein the at least one link includes a first link and a second link, wherein the first housing part is connected to the first link and the second housing part is connected to the second link, wherein the housing parts are movable relative to one another.

10. A headrest, comprising: an adjustment device; a retaining device; and a head contact part movable between a front and a rear position by the adjustment device, wherein the adjustment device comprises at least one link that forms at least one joint with the retaining device and at least one joint with the head contact part, wherein the adjustment device further comprises an adjustment housing that at least partially covers the at least one link, wherein the adjustment housing is motion-connected to the retaining device so that the adjustment device follows a movement of the at least one link, wherein the adjustment housing is configured as a unit, wherein the unit forms a joint with the retaining device, and wherein the unit forms a joint with the head contact part, wherein the adjustment housing has at least two housing parts including a first housing part that is movable relative to a second housing part, wherein the first housing part is securely connected to the at least one link and the second housing part forms a joint with the retaining device or with the head contact part, wherein the second housing part is connected to the first housing part.

11. A headrest, comprising: an adjustment device; a retaining device; and a head contact part movable between a front and a rear position by the adjustment device, wherein the adjustment device comprises at least one link that forms at least one joint with the retaining device and at least one joint with the head contact part, wherein the adjustment device further comprises an adjustment housing that at least partially covers the at least one link, wherein the adjustment housing is motion-connected to the retaining device so that the adjustment device follows a movement of the at least one link, wherein the adjustment housing is configured as a unit, wherein the unit forms a joint with the retaining device, and wherein the unit forms a joint with the head contact part, wherein the head contact part has a head contact housing that at least partially overlaps the adjustment housing and is movable relative to the adjustment housing.

12. A headrest, comprising: an adjustment device; a retaining device; and a head contact part movable between a front and a rear position by the adjustment device, wherein the adjustment device comprises at least one link that forms at least one joint with the retaining device and at least one joint with the head contact part, wherein the adjustment device further comprises an adjustment housing that at least partially covers the at least one link, wherein the adjustment housing is motion-connected to the retaining device so that the adjustment device follows a movement of the at least one link, wherein the at least one link of the adjustment device comprises two links, wherein the two links are a front link and a rear link, wherein the housing is formed by a front housing part and a rear housing part that are movable relative to one another, and wherein the front housing part is attached to the front link and the rear housing part is attached to the rear link.

* * * * *